United States Patent
Hausler et al.

(10) Patent No.: US 9,713,980 B2
(45) Date of Patent: Jul. 25, 2017

(54) BODY STRUCTURE PILLAR REINFORCEMENT FOR SPOTLIGHT SHAFT

(71) Applicant: Ford Global Technologies, LLC, Dearborn, MI (US)

(72) Inventors: Henry W. Hausler, Manchester, MI (US); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/943,447

(22) Filed: Nov. 17, 2015

(65) Prior Publication Data
US 2017/0136941 A1     May 18, 2017

(51) Int. Cl.
*B62D 25/04*     (2006.01)
*B60Q 1/24*     (2006.01)

(52) U.S. Cl.
CPC .............. *B60Q 1/24* (2013.01); *B60Q 1/245* (2013.01); *B62D 25/04* (2013.01)

(58) Field of Classification Search
CPC ............ B62D 25/04; B60C 1/24; B60C 1/245
USPC .......... 296/193.06, 203.01, 203.03; 362/487, 362/459
See application file for complete search history.

(56) References Cited

U.S. PATENT DOCUMENTS

| | | | | | |
|---|---|---|---|---|---|
| 1,565,936 | A | * | 12/1925 | Hart | B41J 15/02 400/615.1 |
| RE16,979 | E | * | 5/1928 | Sklarek | B60Q 1/245 362/423 |
| 1,699,508 | A | * | 1/1929 | Sklarek | B60Q 1/24 362/423 |
| 2,454,931 | A | * | 11/1948 | Larson | B60Q 1/245 362/422 |
| 2,698,376 | A | * | 12/1954 | Gross | B60Q 1/245 362/458 |
| 5,269,584 | A | * | 12/1993 | Takagi | B62D 21/09 16/2.1 |
| 5,772,277 | A | * | 6/1998 | Fukuda | B62D 25/04 296/146.15 |
| 5,879,099 | A | * | 3/1999 | Thoms | B21D 39/04 403/279 |

(Continued)

FOREIGN PATENT DOCUMENTS

WO     2015098673 A1     7/2015

OTHER PUBLICATIONS

Unity manufacturing Co., Parts Sheet, 4 pages, http://www.unityusa.com/assets/images/105-6PartsSheet.pdf, Oct. 21, 2012.

*Primary Examiner* — Gregory Blankenship
(74) *Attorney, Agent, or Firm* — Jason C. Rogers; Brooks Kushman P.C.

(57) ABSTRACT

A vehicle is equipped with a spotlight. The spotlight has a rod that passes through a pillar of the vehicle, such as the A-pillar. The A-pillar includes one or more beams. The beam is provided with an aperture or a through-hole for the rod to pass through. One or more sleeves are provided with a tubular body and a flange. The flange is secured to the beam and is oriented such that the tubular body passes at least partially through the aperture or through-hole. The sleeve provides an engagement surface that surrounds the rod of the spotlight while improving structural rigidity of that portion of the pillar.

18 Claims, 3 Drawing Sheets

(56) References Cited

U.S. PATENT DOCUMENTS

| | | |
|---|---|---|
| 7,032,959 B2 | 4/2006 | Berstecher et al. |
| 7,264,302 B2 | 9/2007 | Nagashima |
| 7,687,387 B2 * | 3/2010 | Inaba .................... H01L 27/105 257/E21.249 |
| 2004/0201253 A1 * | 10/2004 | Kitagawa ............... B62D 21/15 296/187.03 |
| 2011/0101735 A1 * | 5/2011 | Fujita ................... B62D 21/152 296/193.06 |
| 2011/0221236 A1 * | 9/2011 | She ....................... B60R 13/025 296/191 |
| 2014/0232138 A1 | 8/2014 | Kanaguichi |
| 2016/0039359 A1 * | 2/2016 | Bach ....................... B60R 13/00 296/193.06 |

* cited by examiner

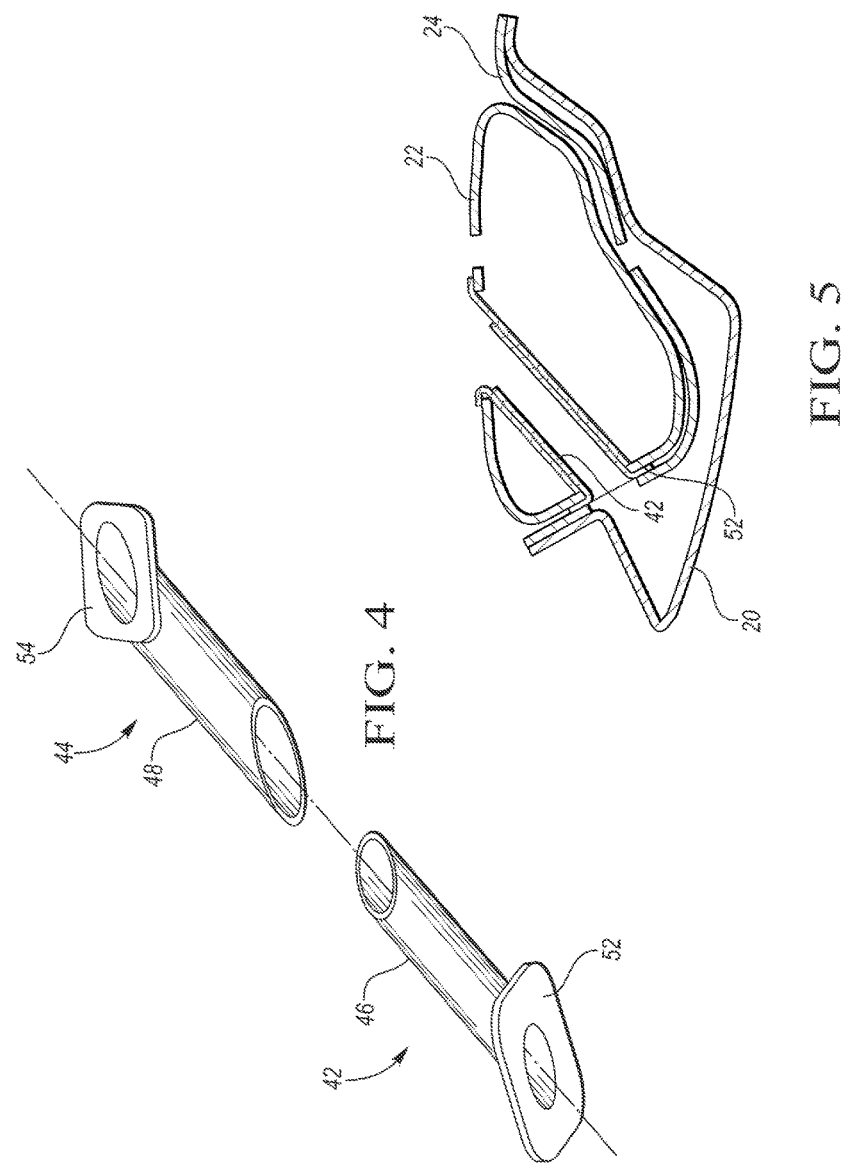

BODY STRUCTURE PILLAR REINFORCEMENT FOR SPOTLIGHT SHAFT

TECHNICAL FIELD

This disclosure relates to structural reinforcements for an accessorial spotlight of a vehicle.

BACKGROUND

Spotlights on vehicles are known in the art. For example, police and other emergency vehicles are typically equipped with a spotlight. Many types of spotlights are located outside of the vehicle, but are capable of being oriented or controlled by an occupant inside of the vehicle. This can be made possible due to a rod extending from the spot light and through the vehicle. For example, one typical type of spotlight is controlled by a rod that passes through the A-pillar of the vehicle to allow the driver, such as a police officer, to control the spotlight.

SUMMARY

According to one embodiment, a vehicle includes an A-pillar beam that extends along a length and defines a through-hole extending transverse to the length. A reinforcing sleeve has a tubular body ending in a flange. The flange is mounted to the A-pillar beam, and the body extends at least partially through the through-hole.

A spotlight can be attached to the A-pillar beam. The spotlight may include a rod extending through the reinforcing sleeve and through the through-hole.

A second reinforcing sleeve may include a second tubular body ending in a second flange. The second flange can be mounted to an opposite side of the A-pillar beam from the flange.

The first and second reinforcement sleeves may cooperate to define a common structural support for the rod to extending through.

The A-pillar beam may be a roof rail reinforcement beam. The vehicle may further comprise an A-pillar reinforcement member mounted to the roof rail reinforcement beam. The flange may be engaged with both the roof rail reinforcement beam and the A-pillar reinforcement member.

The roof rail reinforcement beam may include an inner surface facing an interior of the roof rail reinforcement beam and an opposing outer surface, and the flange may be mounted to the outer surface.

The A-pillar beam may have an inner surface defining a hollow interior extending along a length of the A-pillar beam and an opposing outer surface, and the flange may be mounted to the outer surface.

According to another embodiment, a vehicle includes a roof rail reinforcement beam extending from a roof portion of the vehicle toward a front of the vehicle. A side outer panel is attached to the beam. The side outer panel and the beam cooperate to at least partially define a pillar. A reinforcing sleeve is disposed within the pillar, extends through the beam, and provides a support surface for a rod of a spotlight.

According to yet another embodiment, a method of reinforcing a region of a pillar for supporting a spotlight rod is provided. The method includes forming a panel of a vehicle pillar out of metal, and removing metal to provide a hole extending through the panel. Prior to completion of assembly of the vehicle, a reinforcement sleeve is inserted through the hole and joins a flange of the sleeve to the vehicle pillar.

BRIEF DESCRIPTION OF THE DRAWINGS

FIG. 4 is a perspective isolation view of a reinforcement sleeve within the pillar to provide structural reinforcement for the spotlight, according to one embodiment; and FIG. 5 is a cross-sectional view of the vehicle pillar taken along line 5-5 of FIG. 1, according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
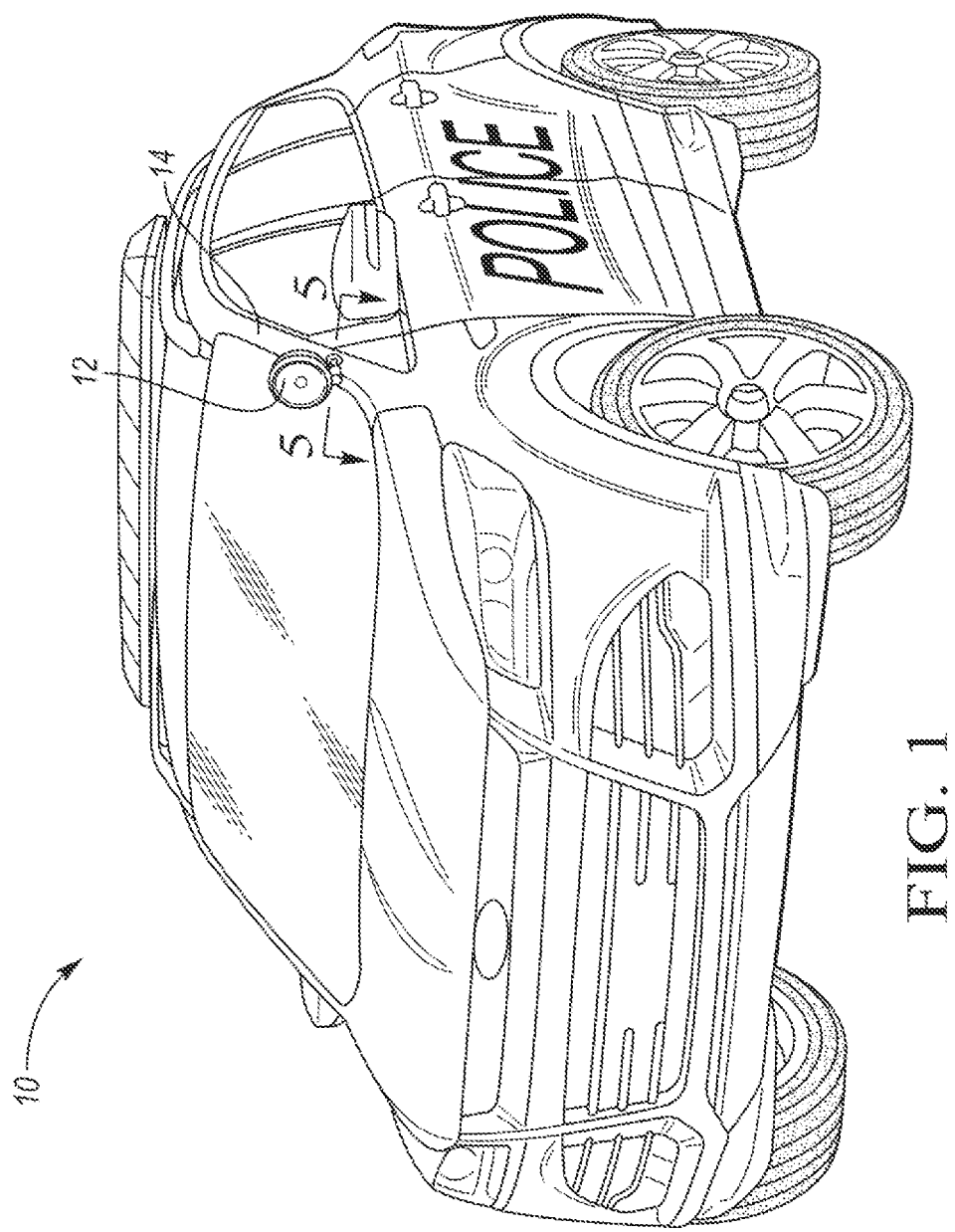
FIG. 1 is a perspective view of a vehicle equipped with a spotlight, according to one embodiment.

FIG. 1 illustrates an exemplary vehicle 10 that is equipped with a spotlight 12. The vehicle 10 may be a police vehicle, an ambulance, a fire truck, or other emergency vehicles that may be suited for a spotlight 12. For these and other types of specialty vehicles, the spotlights 12 may be equipped as an accessory to the vehicle, after the completion of the manufacturing of the vehicle.

The spotlight 12 may extend through the A-pillar 14 of the vehicle. More particularly, the spotlight 12 may be located at the end of a rod that extends through the A-pillar 14 of the vehicle. The rod may include a handle at one end opposite from the spotlight 12. An occupant within the vehicle 10 can manipulate the handle of the rod to maneuver, orient, and position the spotlight to illuminate a desired location. In other embodiments, additional spotlights may be provided through the B-pillar and/or C-pillar of the vehicle to allow other vehicle occupants to illuminate other areas.

On a fleet of police vehicles that require the spotlight 12 to be mounted through a pillar of the vehicle 10, a hole may be drilled or otherwise made to create an opening for the rod of the spotlight to pass through. Or, the hole may be formed during manufacturing of the vehicle. Creation of this hole may create stresses on the pillar, which has the potential to reduce the structural capabilities of the pillar. Furthermore, if the hole is drilled by aftermarket companies, the quality attributes of the hole and the effects on the advanced high strength metals may be less than desirable.

According to various aspects of the present disclosure, a specific structural reinforcement subassembly is provided for supporting the rod of the spotlight 12. This structural reinforcement reduces stresses on the pillar due to removal of material to create the hole for the pillar of the spotlight 12.

Figure 2:
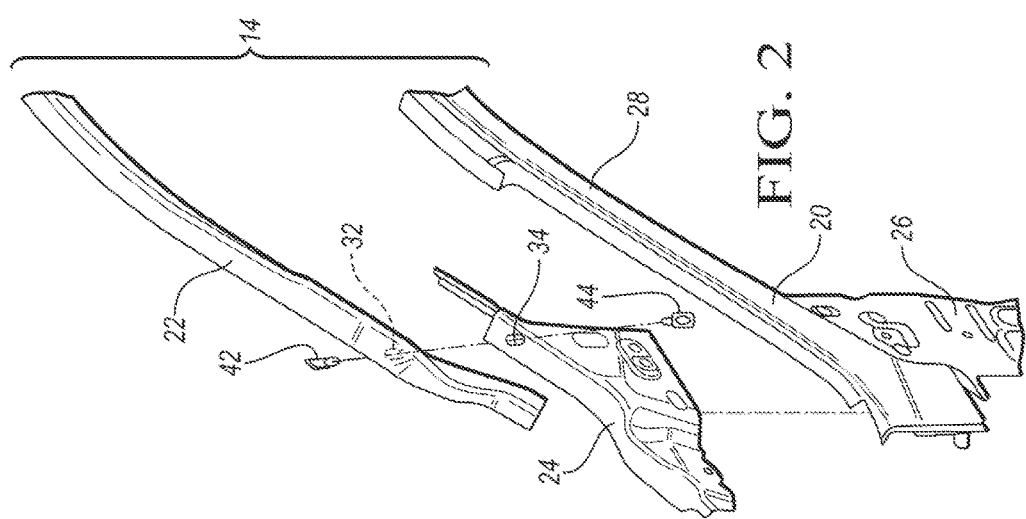
FIG. 2 is a front perspective exploded view of a vehicle pillar with a structural reinforcement for the spotlight, according to one embodiment.

Referring to FIG. 2, an exploded view of a portion of the A-pillar of the vehicle 10 is shown. The vehicle 10 includes a body-side outer panel 20 that is mounted or otherwise secured to a roof rail reinforcement 22. While not shown, the body-side outer panel 20 can continue and form the exterior-side of the B-pillar, C-pillar, D-pillar, and so on. The roof rail reinforcement 22 extends up along at least a portion of the A-pillar, and towards the rear of the vehicle 10 to reinforce the roof of the vehicle 10. The shell of the A-pillar 14 is formed when the body-side outer panel 20 is attached to the roof rail reinforcement 22. Either the body-side outer panel 20 or the roof rail reinforcement 22 can be referred to an A-pillar beam.

Between the body-side outer panel 20 and the roof rail reinforcement 22 is an A-pillar reinforcement member 24. This member 24 is situated at a corner of the A-pillar, at an intersection of a lower portion 26 of the body-side outer panel 20 (that may extend generally vertical) and an upper portion 28 of the body-side outer panel 20 (that extends transversely from the lower portion 26 and toward the rear of the vehicle 10). Other pillar reinforcement members may be provided at the B-pillar, C-pillar, etc. The member 24 provides additional structural support at this juncture of the A-pillar. The member 24 can attach to either or both of the body-side outer panel 20 and the roof rail reinforcement 22, but at least the majority of the member 24 is disposed between both 20, 22.

Figure 3:
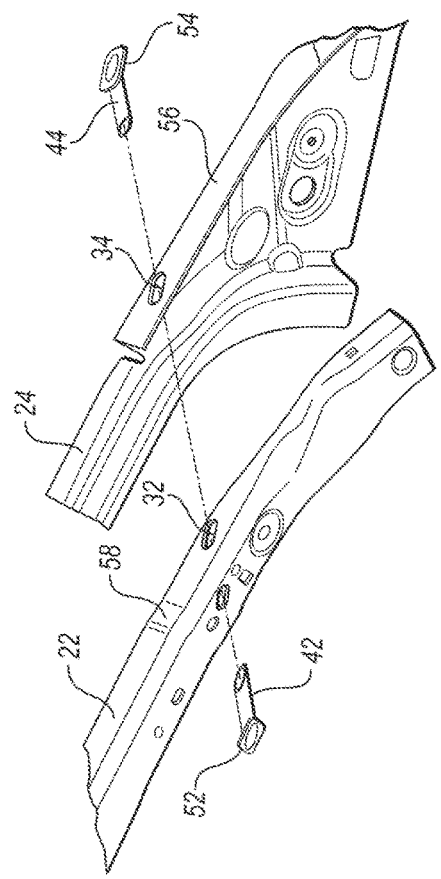
FIG. 3 is a side perspective view of a portion of the vehicle pillar of FIG. 2, according to one embodiment.

As shown in FIGS. 2 and 3, the roof rail reinforcement 22 may define a cut-out or aperture 32, and the A-pillar reinforcement member 24 may also define a cut-out or aperture 34. These apertures may be formed according to the methods described above. The apertures 32, 34 align to provide a through-hole for insertion of the rod of the spotlight 12.

Referring to FIGS. 2-4, one or more reinforcement sleeves 42, 44 are inserted through the through-hole to provide structural support in the region that supports the spotlight's rod. In one particular embodiment, a first reinforcement sleeve 42 extends through at least a portion of the aperture 32 of the roof rail reinforcement 22. The aperture 32 may be two or more separate apertures formed in two or more panels of the roof rail reinforcement 22, as shown in FIG. 3. The reinforcement sleeve 42 can include a tubular body 46 that has a length that enables the sleeve to extend through both of the apertures of the roof rail reinforcement 22 of FIG. 3.

A second reinforcement sleeve 44 extends through at least a portion of the aperture 34 of the A-pillar reinforcement member 24. The second reinforcement sleeve 44 can also include a tubular body 48 to enable the sleeve 44 to extend through any necessary apertures in the A-pillar reinforcement member 24.

The first sleeve 42 can include a first flange 52, and the second reinforcement sleeve 44 can include a second flange 54. The first flange 52 of the first sleeve 42 can be mounted, welded, fastened, or otherwise secured to an exterior surface of the roof rail reinforcement 22, while the tubular body 46 extends at least partially through the aperture 32. The second flange 54 of the second sleeve 44 can be similarly secured to an exterior surface of the A-pillar reinforcement member 24, while the tubular body 48 extends at least partially through the aperture 34. In particular, the A-pillar reinforcement member 24 may include a flange 56 that defines the aperture 34, and provides a mating surface for the flange 54 of the second sleeve 44. The flange 56 can mate and engage with a corresponding flange 58 of the roof rail reinforcement 22. One of both flanges 56, 58 can be located offset from the body-side outer panel such that the spotlight rod passes through both of the roof rail reinforcement 22 and the A-pillar reinforcement member 24, but not through the body-side outer panel 20.

One of the sleeves 42, 44 can be sized such that its tubular body has a larger diameter than that of the other sleeve 42, 44. This allows the one of the sleeves to be inserted partially into the other sleeve during manufacturing of the support system. In the example shown in FIG. 4, the second sleeve 44 has a larger diameter of the interior of its tubular body 48 than the tubular body 46 of the first sleeve 42.

In another embodiment, both sleeves 42, 44 have equivalent diameters of their tubular bodies 46, 48. The sleeves can be spaced apart when fixed in the A-pillar. When assembled, the rod of the spotlight passes through both sleeves 42, 44 along the central axis of both.

FIG. 5 is a cross-sectional view of the vehicle's A-pillar to illustrate the interrelation of one of the sleeves 42. The flange 52 of the sleeve 42 is secured to an outer surface of the roof rail reinforcement 22. The A-pillar reinforcement member 24 is illustrated as extending over the flange 52 of the sleeve 42 from this angle. Overlapping apertures in both the A-pillar reinforcement member 24 and the roof rail reinforcement 22 provide for a common through-hole for the sleeve 42 to be secured at least partially therethrough. Thus, a spotlight rod is support by the sleeve 42, and the sleeve 42 improves the structural integrity of the A-pillar.

In one embodiment, the body-side outer panel 20 is not provided with a hole during manufacturing of the vehicle. After manufacturing of the vehicle and in an after-market setting, the body-side outer panel 20 can be drilled at a location of the through hole that passes through the roof rail reinforcement 22 and the A-pillar reinforcement member 24. The absence of a hole in the body-side outer panel 20 allows the vehicle 10 to be equipped with the sleeves 42, 44 even if the vehicle 10 is never equipped with a spotlight without the exterior of the vehicle having any visible hole for the spotlight rod.

The embodiments above describe the first sleeve 42 being secured within the roof rail reinforcement 22, and the second sleeve 44 being secured within the A-pillar reinforcement member 24. However, in another embodiment (not shown), the second sleeve (or a third sleeve) can be secured to pass through the body-side outer panel 20 at a location such that its tubular body aligns with those of the other sleeves. This would allow the spotlight rod to pass through the roof rail reinforcement 22, the A-pillar reinforcement member 24, and also through the body-side outer panel 20.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
   an A-pillar beam extending along a length and defining a through-hole extending transverse to the length, wherein the A-pillar beam has an inner surface defining a hollow interior extending along the length and an opposing outer surface; and
   a reinforcing sleeve having a tubular body ending in a flange, wherein the flange is mounted to the outer surface and the body extends at least partially through the through-hole.

2. The vehicle of claim 1 further comprising a spotlight attached to the A-pillar beam, wherein the spotlight includes a rod extending through the reinforcing sleeve and through the through-hole.

3. The vehicle of claim 1 further comprising a second reinforcing sleeve having a second tubular body ending in a second flange, wherein the second flange is mounted at an opposite side of the A-pillar beam from the flange.

4. The vehicle of claim 1, wherein the A-pillar beam is a roof rail reinforcement beam, wherein the vehicle further comprises an A-pillar reinforcement member mounted to the roof rail reinforcement beam, and wherein the flange is engaged with the roof rail reinforcement beam and the A-pillar reinforcement member.

5. The vehicle of claim 4, wherein the roof rail reinforcement beam includes an inner surface facing an interior of the roof rail reinforcement beam and an opposing outer surface, wherein the flange is mounted to the outer surface.

6. The vehicle of claim 4 further comprising a side outer panel, wherein the through-hole extends through the side outer panel and the tubular body extends at least partially through the side outer panel.

7. A vehicle comprising:
   a roof rail reinforcement beam extending from a roof portion of the vehicle toward a front of the vehicle;
   a side outer panel attached to the beam, wherein the side outer panel and the beam cooperate to at least partially define a pillar with a through-hole extending from the beam to the side outer panel; and
   a reinforcing sleeve within the through-hole providing a support surface for a rod of a spotlight.

8. The vehicle of claim 7, wherein the reinforcing sleeve includes a tubular body and a flange extending therefrom, wherein the tubular body extends through the beam and the flange is mounted to an outer surface of the beam.

9. The vehicle of claim 8 further comprising a second reinforcing sleeve including a second flange that is mounted to the beam, wherein the second reinforcing sleeve is aligned with the reinforcing sleeve to cooperatively define a through-hole for insertion of the rod.

10. The vehicle of claim 8, wherein the flange and the tubular body intersect to define an acute angle.

11. The vehicle of claim 8 further comprising a pillar-reinforcement member coupled to the beam, wherein the flange is retained between the beam and the pillar-reinforcement member.

12. The vehicle of claim 11 further comprising a second reinforcing sleeve including a second flange that is mounted to the pillar-reinforcement member.

13. A method comprising:
   securing a roof rail reinforcement beam to a body side outer panel to define a vehicle pillar;
   removing metal to provide a hole extending through the panel; and
   prior to completion of assembly of the vehicle, inserting a reinforcement sleeve through the hole and joining a flange of the sleeve to an outer surface of the roof rail reinforcement beam.

14. The method of claim 13, wherein the panel is part of the roof rail reinforcement beam and the hole is provided within the roof rail reinforcement beam.

15. The method of claim 13, wherein the joining includes welding the flange to the outer surface of the roof rail reinforcement beam.

16. The method of claim 15 further comprising removing metal from a pillar-reinforcement member to provide a second hole extending through the member, and securing the member to the roof rail reinforcement beam such that the second hole aligns with the hole.

17. The method of claim 13 further comprising removing metal from a pillar-reinforcement member to provide a second hole extending through the member.

18. The method of claim 17, wherein the joining includes joining the flange to and between the roof rail reinforcement beam and the pillar-reinforcement member.

* * * * *